US012654194B2

(12) United States Patent
Wittich et al.

(10) Patent No.: US 12,654,194 B2
(45) Date of Patent: Jun. 16, 2026

(54) METHOD FOR CHANGING A WORKPIECE CARRIER DEVICE, WORKPIECE CARRIER DEVICE AND PRODUCTION PLANT FOR COATING SUBSTRATES

(71) Applicant: ALD Vacuum Technologies GmbH, Hanau (DE)

(72) Inventors: Jörg Wittich, Otzberg (DE); Simon Oberle, Erlenbach (DE); Jürgen Hotz, Münster (DE); Stefan Kunkel, Biebergemünd (DE); Wolfgang Rieth, Gelnhausen (DE)

(73) Assignee: ALD Vacuum Technologies GmbH, Hanau (DE)

( * ) Notice: Subject to any disclaimer, the term of this patent is extended or adjusted under 35 U.S.C. 154(b) by 574 days.

(21) Appl. No.: 18/020,845

(22) PCT Filed: Jul. 14, 2021

(86) PCT No.: PCT/EP2021/069596
§ 371 (c)(1),
(2) Date: Feb. 10, 2023

(87) PCT Pub. No.: WO2022/033792
PCT Pub. Date: Feb. 17, 2022

(65) Prior Publication Data
US 2023/0302487 A1      Sep. 28, 2023

(30) Foreign Application Priority Data
Aug. 12, 2020      (DE) ..................... 10 2020 121 241.0

(51) Int. Cl.
*B05C 13/00*      (2006.01)
*B25J 11/00*      (2006.01)

(52) U.S. Cl.
CPC ........... *B05C 13/00* (2013.01); *B25J 11/0075* (2013.01)

(58) Field of Classification Search
None
See application file for complete search history.

(56) References Cited

U.S. PATENT DOCUMENTS 4,976,177 A * 12/1990 Fouche .............. B23Q 11/0032
310/90.5
6,946,034 B1      9/2005 Bruce et al.
(Continued)

FOREIGN PATENT DOCUMENTS

CN      101085595 A      12/2007
CN      111137726 B      5/2024
(Continued)

OTHER PUBLICATIONS

International Search Report dated Nov. 3, 2021, prepared in International Application No. PCT/EP2021/069596.

*Primary Examiner* — Jethro M. Pence
(74) *Attorney, Agent, or Firm* — Barnes & Thornburg LLP; Ryan L. Marshall

(57) ABSTRACT

The disclosure relates to a method for changing a workpiece carrier device in a production plant for coating substrates. The method comprises the steps of:
displacing a workpiece carrier device by means of a robot from a supply zone to a processing zone;
releasably coupling the workpiece carrier device to the production plant via a coupling interface of the workpiece carrier device by further displacing the workpiece carrier device by means of the robot,
wherein for releasably coupling the workpiece carrier device to the production plant, a connecting arm of the workpiece carrier device is coupled to a connection
(Continued)

section of the production plant, thereby fixing the connecting arm in a fixed position relative to the connection section, and wherein for releasably coupling the workpiece carrier device to the production plant, a drive shaft of the workpiece carrier device is coupled to a driving shaft of the production plant, thereby connecting the drive shaft to the driving shaft in a rotatably drivable manner.

15 Claims, 10 Drawing Sheets

(56) References Cited

U.S. PATENT DOCUMENTS

| | | | | |
|---|---|---|---|---|
| 7,357,842 | B2 * | 4/2008 | Ishikawa | G03B 27/32 |
| | | | | 414/217 |
| 7,694,647 | B2 * | 4/2010 | Ishikawa | H01L 21/67109 |
| | | | | 417/217 |
| 7,743,728 | B2 * | 6/2010 | Ishikawa | H01L 21/67754 |
| | | | | 417/217 |
| 7,997,227 | B2 * | 8/2011 | Bruce | C23C 14/30 |
| | | | | 118/723 EB |
| 8,146,530 | B2 * | 4/2012 | Ishikawa | H01L 21/67178 |
| | | | | 414/217 |
| 8,181,596 | B2 * | 5/2012 | Ishikawa | H01L 21/6831 |
| | | | | 414/217 |
| 8,215,262 | B2 * | 7/2012 | Ishikawa | G03F 7/40 |
| | | | | 414/217 |
| 8,529,419 | B2 * | 9/2013 | Kawasumi | B23Q 7/045 |
| | | | | 29/27 R |
| 8,550,031 | B2 * | 10/2013 | Ishikawa | H01L 21/67109 |
| | | | | 414/217 |
| 12,024,769 | B2 * | 7/2024 | Gwehenberger | |
| | | | | H01L 21/68771 |
| 2008/0223291 | A1 | 9/2008 | Bruce et al. | |
| 2013/0071575 | A1 | 3/2013 | Mueller | |
| 2015/0361556 | A1 | 12/2015 | Neal et al. | |
| 2022/0195587 | A1 * | 6/2022 | Meiler | C23C 8/36 |
| 2023/0115509 | A1 * | 4/2023 | Lee | H01L 21/67167 |
| | | | | 414/744.5 |
| 2023/0302487 | A1 * | 9/2023 | Wittich | B25J 11/0075 |
| 2025/0128374 | A1 * | 4/2025 | Hofmann | B23Q 3/061 |

FOREIGN PATENT DOCUMENTS

| | | |
|---|---|---|
| JP | S6034282 A | 2/1985 |
| JP | H0697213 A | 4/1994 |

* cited by examiner

METHOD FOR CHANGING A WORKPIECE CARRIER DEVICE, WORKPIECE CARRIER DEVICE AND PRODUCTION PLANT FOR COATING SUBSTRATES

PRIORITY & CROSS-REFERENCE TO RELATED APPLICATION

This application is a National Stage application of International Application No. PCT/EP2021/069596, filed Jul. 14, 2021. This application also claims priority under 35 U.S.C. § 119 to German Patent Application No. 10 2020 121 241.0, filed Aug. 12, 2020, which is incorporated herein by reference.

BACKGROUND OF THE DISCLOSURE

1. Field of the Disclosure

The present disclosure relates to a method for automated or fully automated changing a workpiece carrier device in a production plant for coating substrates, in particular for coating turbine blades, vanes, air baffles, etc. by means of an EB PVD process (EB PVD: Electron-Beam Physical Vapor Deposition). Furthermore, the present disclosure relates to a corresponding workpiece carrier device and a corresponding production plant, which enable fully automated changing of the workpiece carrier device. In the sense of the present disclosure, a workpiece carrier device for a production plant for coating substrates may also be referred to as a rake, TBC rake or the like (TBC: Turbine Blade Coating).

2. Discussion of the Related Art

In production plants known from practice for coating substrates, such as turbine blades, air baffles, etc., the workpiece carriers (so-called rakes) are manually assembled and disassembled by the plant operator in a loading chamber of a coating chamber. In this case, the coated substrates are removed individually from the workpiece carrier in the loading chamber. The substrates to be newly coated are also individually placed on the workpiece carrier in the loading chamber. Manual assembling and disassembling of the individual substrates makes these substrate changing processes time-consuming.

Since the substrates reach temperatures of up to 1000° C. during coating, a certain cooling time must also be allowed before they are removed. At a temperature of around 600° C., the individual substrates are then removed manually by the operator by use of heat-resistant gloves.

Changing substrates manually in this way is time-consuming, unergonomic and often safety-critical. During assembly and disassembly, the respective loading and coating chamber of the production plant cannot be used for coating. In addition, during manual assembly and disassembly under the above-mentioned boundary conditions, handling errors can occur, resulting in plant downtimes.

SUMMARY OF THE DISCLOSURE

Thus, it is an object of the disclosure to provide a method, a workpiece carrier device and a production plant which overcome the disadvantages of the prior art. In particular, it is the object of the disclosure to provide a solution that enables a fast and reproducible substrate change in a coating plant.

These and other objects are addressed in the present disclosure. Further developments and embodiments of the method, the workpiece carrier device and the production plant are subject matter of the dependent claims and the following description.

One aspect of the disclosure relates to a method for changing a workpiece carrier device in a production plant for coating substrates, in some embodiments, for coating substrates such as turbine blades, vanes, air baffles, etc., in some embodiments, by means of an EB PVD process (EB PVD: Electron-Beam Physical Vapor Deposition). In particular, the method may comprise automated or fully automated changing of the workpiece carrier device. In the sense of the present disclosure, a workpiece carrier device for a production plant for coating substrates may also be referred to as a workpiece carrier, rake, TBC rake or the like (TBC: Turbine Blade Coating).

The method comprises displacing the workpiece carrier device by means of a robot from a supply zone at the production plant to a processing zone in the production plant. The displacing may include gripping the workpiece carrier device by means of a robot gripper of the robot, lifting the workpiece carrier device, and pivoting the workpiece carrier device. The robot can be, for example, an articulated-arm robot, a gantry robot, a handling system (a handling device) with multiple axes, or the like. The robot gripper may be designed to grip at least one, at least two, or more than two workpiece carrier device(s).

The method comprises a releasable coupling of the workpiece carrier device to the production plant via a coupling interface of the workpiece carrier device and a connection section of the production plant in the processing zone. The releasable coupling is realized by further displacement of the workpiece carrier device by means of the robot. In particular, the further displacement can be a vertical displacement, or more precisely a lowering, of the workpiece carrier device. The further displacement usually takes place following the displacement of the workpiece carrier device to a designated position in the processing zone, in particular into a loading chamber.

For releasable coupling of the workpiece carrier device to the production plant, a connecting arm of the workpiece carrier device is mechanically coupled to a connection section of the production plant, whereby the connecting arm is fixed or held in a fixed position relative to the connection section. Thereby, the entire frame structure of the workpiece carrier device is fixed or held in a fixed position relative to the connection section, since the connecting arm can in some embodiments be formed integrally with the frame structure or be a part of the frame structure or at least be fixedly connected to the frame structure. This fixed mechanical coupling is releasable, in particular by a vertical displacement in the form of a lifting movement of the workpiece carrier device by means of the robot.

Furthermore, for releasably coupling the workpiece carrier device to the production plant, a drive shaft of the workpiece carrier device is mechanically coupled to a driving shaft of the production plant, whereby the drive shaft is connected to the driving shaft in a rotatably drivable manner. This mechanical coupling is also releasable, in particular by vertical displacement in the form of the lifting movement of the workpiece carrier device by means of the robot.

The method according to the disclosure thus makes it possible to change the entire workpiece carrier device, which comprises a large number of individual holders or substrate receptacles with substrates arranged thereon, in a simple manner. The entire workpiece carrier device, including a plurality of substrates, can thus be automatically decoupled as a unit from the other components of the production plant by means of the robot and with the aid of the mechanical coupling interface provided on the workpiece carrier device, and moved to the supply zone or a removal zone. From there, the workpiece carrier device can be transported further and assembled and disassembled in an assembly and disassembly zone. In the meantime, a new prepared workpiece carrier device with substrates to be coated can be moved from a supply zone to the processing zone by means of the robot and coupled to the production plant. Thus, unlike conventional production plants, assembly and disassembly within the plant is no longer carried out individually and manually. Instead, a large number of substrates are changed automatically at the same time. Thanks to the robot-actuated mechanical coupling and displacement, the change can be carried out reproducibly, quickly and in a secure manner. At the same time, the workload of the plant operator is reduced.

In a further development of the process, the robot can comprise a displaceable locking bolt. The displaceable locking bolt can be inserted into a first through-hole formed in the connecting arm and simultaneously into a first drive shaft hole formed in the drive shaft before the workpiece carrier device is displaced to the processing zone. This can block a relative rotation between the drive shaft and the connecting arm, in particular during displacement and coupling of the workpiece carrier device. The displaceable locking bolt can be removed or withdrawn from the first through hole and the first drive shaft hole after the workpiece carrier device has been releasably coupled to the production plant. This may allow a relative rotation between the drive shaft and the connecting arm, which may be required, for example, during subsequent coating of the substrates to move them in accordance with an intended program.

It is understood that the displaceable locking bolt can be automatically displaced into and out of the first holes. The displaceable locking bolt of the robot can be displaceable pneumatically, hydraulically and/or electromechanically. By inserting and withdrawing the displaceable locking bolt into associated first holes, the reproducibility of the coupling and thus the changeover can be further improved, thus further increasing the safety. The locking bolt can be linearly displaceable, in particular vertically displaceable.

According to a further development, the workpiece carrier device can be arranged in the supply zone on a centering tray or centering platform with a centering bolt formed thereon in such a way that the centering bolt engages in a second through-hole formed in the connecting arm and in a second drive shaft hole formed in the drive shaft. This can block a relative rotation between the drive shaft and the connecting arm. The centering bolt may in particular be a fixed centering bolt. The second holes may be spaced from the first holes in the circumferential direction of the connecting arm or the drive shaft, for example offset by 180°. The second holes can in some embodiments be arranged coaxially with the first holes. The centering bolt can be inserted into the associated first holes by precisely positioning the workpiece carrier device in a predetermined position on the centering tray by means of the robot. In particular, the centering bolt can be inserted into the associated second holes by lowering the workpiece carrier device by means of the robot.

The centering bolt can be fully inserted into the second holes before the displaceable locking bolt is withdrawn from the associated first holes and, in some embodiments, before the robot releases the workpiece carrier device. Thus, it can be ensured that the drive shaft is fixed relative to the connecting arm as long as the drive shaft is not mechanically coupled to the driving shaft.

The centering tray can be displaceable or movable so that it, together with the workpiece carrier device and substrates positioned thereon, can be moved from the supply zone to an assembly and disassembly zone remote from the production plant.

Before coupling the drive shaft with the driving shaft, in a further development of the method the driving shaft of the production plant can be brought into a predetermined rotational position relative to the drive shaft by means of a controller. This can simplify the subsequent coupling or engagement of a section of the drive shaft with a section of the driving shaft. The controller may be, for example, a memory programmable logic controller or comprise a PLC program.

Alignment of the driving shaft to the predetermined rotational position relative to the driving shaft can already be realized by an alignment for previous decoupling of a workpiece carrying device, in which case the driving shaft remains in the aligned rotational position during the change.

The alignment of the driving shaft for previous decoupling includes a simultaneous alignment of the drive shaft that is still mechanically coupled therewith. This also brings the drive shaft into a predetermined rotational position of the drive shaft relative to the connecting arm, thereby bringing the first drive shaft hole into common alignment with the first through hole of the connecting arm, and thereby bringing the second drive shaft hole into common alignment with the second through hole of the connecting arm.

In further developments of the method according to the disclosure, automated tracking of the substrates to be coated and/or the coated substrates may further be performed, for example, to determine their position, coating condition, quality, etc. For example, the method may include condition monitoring of the substrates. The condition monitoring may be realized by image processing and/or a measurement of properties of the substrates. The measurement of properties of the substrates may include, for example, a measurement and a comparison of the weight of the workpiece carrier device including substrates before and after coating. These further method steps can make the production plant and the production process even safer and more effective, since unplanned malfunctions can be reduced by the tracking and monitoring, which can lead to shorter downtimes of the plant.

The method can be carried out in particular by means of a workpiece carrier device of the type described below and/or a production plant of the type described below. Features, advantages, functions, modes of operation, embodiments and further developments described in this respect can apply accordingly to further developments of the method and vice versa.

The method may comprise changing more than one workpiece carrier device, for example two, three or more than three workpiece carrier devices, simultaneously. In this case, the features, functions and aspects described above with respect to the workpiece carrier device apply accordingly to the further workpiece carrier device(s).

A further aspect of the disclosure relates to a workpiece carrier device for a production plant for coating substrates, in some embodiments, for coating turbine blades, vanes, air baffles, etc., in some embodiments, by means of an EB PVD process (EB PVD: Electron-Beam Physical Vapor Deposition). The workpiece carrier device may also be referred to herein as a workpiece carrier, rake, TBC rake, or the like.

The workpiece carrier device includes a frame structure having a plurality of individual holders or substrate receptacles formed thereon for holding a plurality of substrates. Each respective individual holder may be formed to hold a substrate.

The workpiece carrier device includes an elongated connecting arm that connects the frame structure, and thus the plurality of individual holders, to a connection section of the production plant. The connecting arm has a longitudinal axis along which the connecting arm extends. In particular, the connecting arm can be tubular. In some embodiments, the connecting arm has a circular cross-sectional area. The connecting arm and the frame structure can in particular be formed in one piece. For example, the connecting arm may be a part, region or section of the frame structure. For example, the connecting arm may be an end portion of the frame structure or the workpiece carrier device.

The workpiece carrier device includes a drive shaft rotatably supported in the connecting arm, the drive shaft being mechanically coupled to the plurality of individual holders to drive or move the plurality of substrates. Thus, the drive shaft is disposed in the connecting arm and extends at least partially through the connecting arm along the longitudinal axis of the connecting arm or has a common longitudinal axis with the connecting arm. By moving the drive shaft, the individual holders mechanically connected thereto and thus the substrates held by them can be moved individually, which is particularly relevant during coating.

The workpiece carrier device comprises a coupling interface via which the workpiece carrier device can be detachably coupled to the production plant by means of a robot. The coupling interface can be formed in particular at an end of the connecting arm facing away from the plurality of individual holders. By means of the coupling interface, the connecting arm can be mechanically coupled to the connection section of the production plant in order to hold the connecting arm and the frame structure (i.e. the workpiece carrier device), which is fixedly connected thereto or integrally formed therewith, in a fixed position relative to the connection section. In addition, by means of the coupling interface, the drive shaft can be mechanically coupled to a driving shaft of the production plant to rotatably connect the drive shaft to the driving shaft. The coupling interface thus realizes both a fixed static connection for holding and fixing the workpiece carrier device and a mechanical connection for transmitting dynamic movements (in particular rotational movements). It is understood that the described mechanical couplings are releasable connections.

In particular, the mechanical couplings can be released or established by a lifting/lowering movement of the workpiece carrier device, i.e. by a vertical displacement of the workpiece carrier device transverse to the longitudinal axis of the connecting arm. The lifting/lowering movement of the workpiece carrier device can be performed by displacing the workpiece carrier device by means of the robot.

The workpiece carrier device according to the disclosure enables an automated and/or fully automated exchange of the entire workpiece carrier device including the frame structure with the plurality of single holders and the plurality of substrates arranged thereon by means of the mechanical coupling interface formed thereon. Such a mechanical coupling interface can also be used under high temperatures and allows a reliable and safe coupling and decoupling even under the ambient conditions in a processing zone of a coating plant.

In one embodiment, the coupling interface comprises two engagement surfaces formed on a peripheral surface of the connecting arm for a robot gripper of the robot. The two engagement surfaces may be arranged substantially opposite to each other. The two engagement surfaces can, for example, be recesses milled into the peripheral surface of the connecting arm, each of which has a substantially flat, non-rounded base surface so that a complementary robot gripper can optimally engage at these base surfaces.

According to a further development, the coupling interface may comprise a first through-hole formed in the connecting arm for a locking bolt of the robot. The coupling interface may comprise a first drive shaft hole formed in the drive shaft for the locking bolt of the robot, wherein the first through hole and the first drive shaft hole are aligned with each other in a predetermined rotational position of the drive shaft relative to the connecting arm. Aligned with each other means here that these two holes are arranged substantially coaxial with each other and spaced apart along their axis of rotation, such that the locking bolt can be inserted into the first drive shaft hole through the first through hole, whereby the locking bolt engages the first through hole and the first drive shaft hole simultaneously. Thus, the locking bolt can block or prevent a relative movement, in particular a rotational movement, between the drive shaft and the connecting arm during engagement. The locking bolt may also be referred to as a locking pin, locking mandrel or the like.

In a further development of the workpiece carrier device, the coupling interface may include a second through-hole formed in the connecting arm for a centering bolt of a centering tray. The coupling interface may comprise a second drive shaft hole formed in the drive shaft for a centering bolt of a centering tray, wherein the second through hole and the second drive shaft hole are aligned with each other in a predetermined rotational position of the drive shaft relative to the connecting arm. In particular, the predetermined rotational position may correspond to the predetermined rotational position described above with respect to the first holes. Aligned with each other means here that these two holes are arranged substantially coaxially with each other and are spaced from each other along their axis of rotation, so that the centering bolt can be inserted into the second drive shaft hole through the second through hole, whereby the centering bolt is simultaneously engaged with the second through hole and the second drive shaft hole. Thus, the centering bolt can block or prevent a relative movement, in particular a rotational movement, between the drive shaft and the connecting arm during engagement. The centering bolt may also be referred to as a centering pin, centering mandrel or the like.

In one embodiment, the coupling interface may comprise a sword-shaped portion formed at one end of the drive shaft. In other words, the coupling interface may comprise a key or projection formed at one end of the drive shaft. The sword-shaped portion or protrusion/key may be formed on an end face of the end of the drive shaft. The end of the drive shaft described herein may be a free end of the drive shaft in a non-assembled state of the workpiece carrier device. The sword-shaped portion or projection/key is configured to come into engagement with a complementary recess (e.g., groove or slot) of the driving shaft, so that a positive connection between the driving shaft and the drive shaft can be realized, allowing at least a transmission of rotational motions from the driving shaft to the drive shaft. To enable an engagement of the sword-shaped portion or projection/key into the complementary recess, the drive shaft and the driving shaft can each be brought into a predetermined rotational position and thus aligned with each other. In particular, the predetermined rotational position of the drive shaft described herein may correspond to the predetermined rotational position described above with respect to the first and/or second holes.

According to a further development, the coupling interface may comprise a collar formed at one end of the connecting arm, in particular at a free end of the connecting arm in a non-assembled state of the workpiece carrier device. The collar may be in the form of an annular segment which extends in an axial direction beyond the end of the connecting arm. The annular segment can have the same outer diameter as the adjoining circumferential surface of the connecting arm. The annular segment may extend the circumferential surface beyond the end of the connecting arm and may be integrally formed with the circumferential surface. The collar may include a retaining projection formed on its inner peripheral surface, which extends from the inner peripheral surface of the collar in the direction of the longitudinal axis. The retaining projection thus represents a type of flange section. The retaining projection may be configured to engage behind a portion or component of the connection portion, in particular a flange of the connection portion, when the workpiece carrier device is coupled.

Another aspect of the disclosure relates to a production plant for coating substrates, in particular for coating turbine blades, vanes, air baffles, etc., in some embodiments, by means of an EB PVD process.

The production plant comprises at least one workpiece carrier device of the type described above, which is releasably connected or connectable to a connection section of a rake arm of the production plant. The production plant comprises a driving shaft rotatably mounted in the connection section and rotatably drivable by means of a motor. The motor may be integrated into the production plant or arranged externally.

In one embodiment, the production plant may comprise a robot configured to connect the workpiece carrier device to the connection section, to decouple the workpiece carrier device from the connection section, and to displace the workpiece carrier device. For example, the robot may be an articulated arm robot, a gantry robot, a handling system (a handling device) with multiple axes, or the like. In particular, the robot may be configured to connect or couple the workpiece carrier device to the connection section of the rake arm by positioning and lowering. In particular, the robot can be configured to decouple or disconnect the workpiece carrier device from the connection section of the rake arm by lifting it. Thus, a very simple coupling and decoupling is possible by use of the workpiece carrier device and a robot.

The robot may include a displaceable locking bolt that is insertable into and removable from the first through-hole and the first drive shaft hole. The locking bolt can be displaceable pneumatically, hydraulically and/or electromechanically, wherein the displacement of the locking bolt can be activated automatically via a control program. The locking bolt can be linearly displaceable, in particular vertically displaceable.

The connection section can comprise an annular ring extending axially from an end face of the rake arm with a flange formed thereon. The rake arm describes a frame section of the production plant for carrying or supporting a workpiece carrier device attachable thereto. The flange extends from an outer peripheral surface of the annular ring in a direction away from a longitudinal axis of the annular ring, more specifically generally upwardly in an assembled operating condition of the production plant. The annular ring and the flange may include a common axial recess formed in the annular ring and the flange. In particular, the axial recess may be formed in an upper region of the annular ring and the flange in an assembled operating condition of the production plant. Via the axial recess, a portion of the drive shaft may be insertable into the connection section (into the annular ring and the flange) to connect the drive shaft to the driving shaft. More specifically, the sword-shaped portion or projection/key of the drive shaft may be insertable through the axial recess into the complementary recess (e.g., groove or slot) of the driving shaft when the driving shaft and the drive shaft are aligned with each other and with the axial recess according to a predetermined rotational position.

For this purpose, the driving shaft can have the complementary recess (e.g. groove or slot) formed in the end face into which the sword-shaped section or the protrusion/key of the drive shaft can be inserted. The end face may be an end face of the driving shaft facing the drive shaft.

In a further development, the production plant may include a centering tray having a centering bolt formed thereon. The centering tray may be arrangeable or disposed at a predetermined position at the production plant, in particular in a supply zone. The workpiece carrier device can be positionable on the centering tray. The centering tray provides a platform for temporarily receiving the workpiece carrier device. The centering bolt may be a fixed bolt, pin, or the like, insertable into the two holes of the connecting arm and the drive shaft to prevent a relative rotation between the drive shaft and the connecting arm. To pick and hold the workpiece carrier device on the centering tray, the workpiece carrier device can be placed on the centering tray by means of the robot.

The production plant may include more than one workpiece carrier device, for example, two, three, or more than three workpiece carrier devices. In this case, the features, functions and aspects described above with respect to the workpiece carrier device apply accordingly to the additional workpiece carrier device(s).

It is understood that the method and the workpiece carrier device are also suitable for other applications and production plants where high temperatures prevail and mechanical motion interfaces are required.

Although some features, advantages, functions, modes of operation, embodiments and further developments have been described above only with respect to the method, the workpiece carrier device or the production plant, they may apply accordingly to the respective other ones of the method, the workpiece carrier device or the production plant.

BRIEF DESCRIPTION OF THE DRAWINGS

Exemplary embodiments of the present disclosure are explained in more detail below with reference to the accompanying schematic figures. In the Figures.

DETAILED DESCRIPTION OF THE DISCLOSURE

Figure 1:
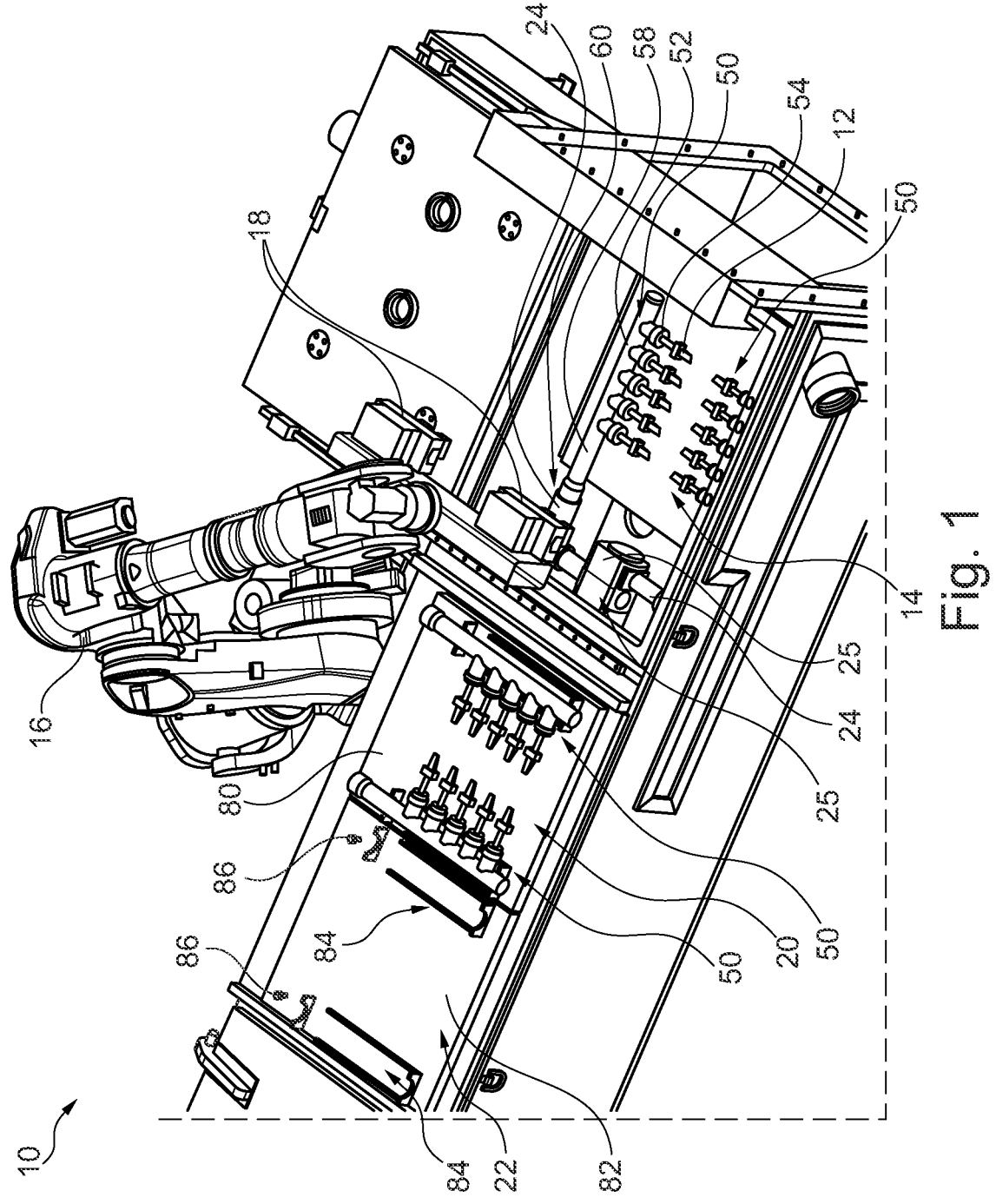
FIG. 1 shows a schematic representation of a production plant according to one embodiment of the disclosure in a first state.
Figure 2:
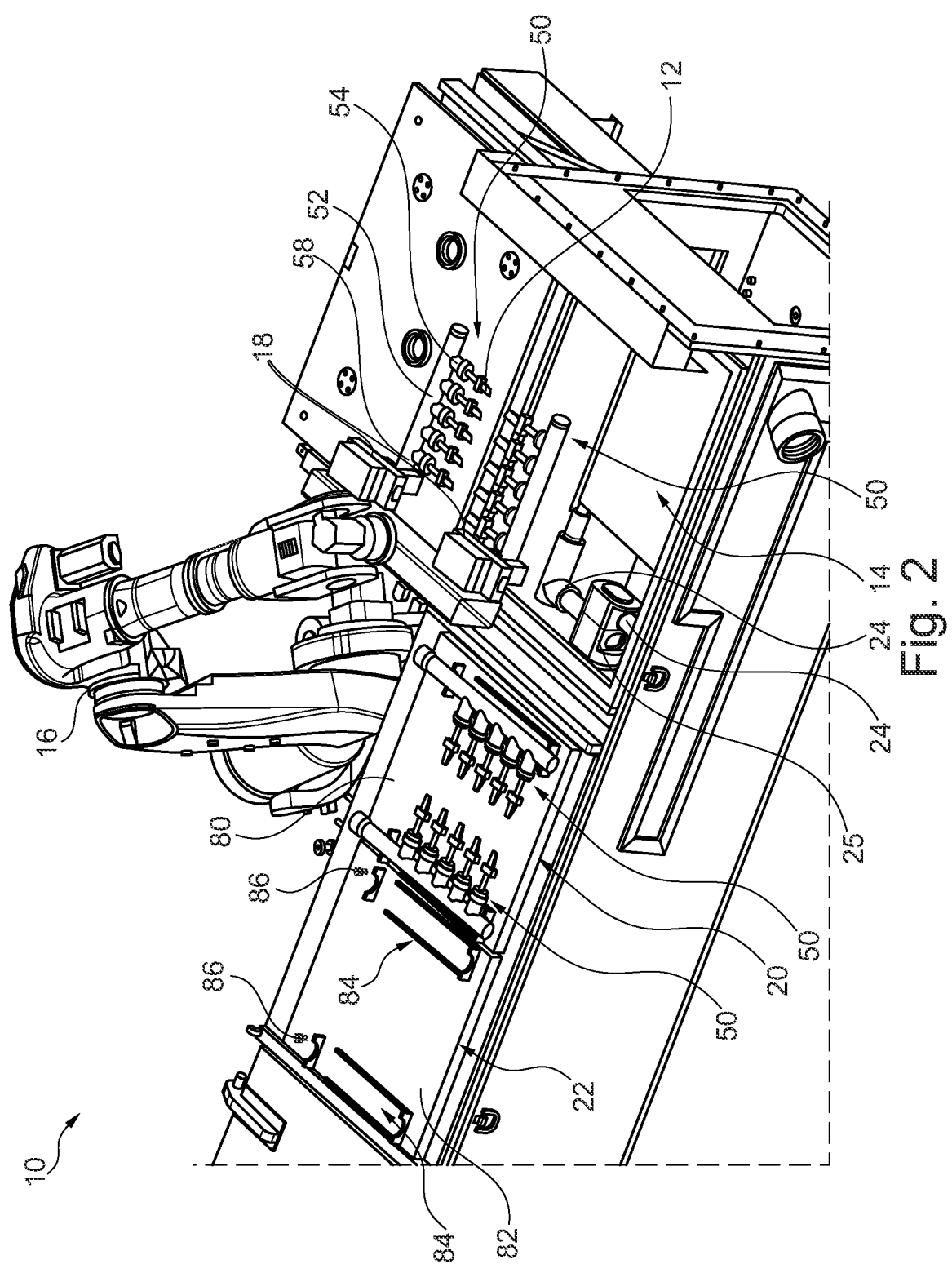
FIG. 2 shows a schematic representation of the production plant of FIG. 1 in a second state.

FIGS. 1 and 2 show a production plant 10 for coating a plurality of substrates 12, only one of which is provided with a reference symbol for the sake of clarity. More precisely, in the embodiment shown, the production plant 10 is a coating plant for coating substrates 12 in the form of turbine blades. Alternatively, the coating plant can also be used for coating blades, air baffles or other components by means of an EB PVD process.

The substrates 12 are attached to or supported by a workpiece carrier device 50 of the production plant 10. In the exemplary embodiment of FIGS. 1 and 2, four workpiece carrier devices 50 are shown. Two workpiece carrier devices 50 respectively form together a double rake arrangement. For the sake of clarity, only the sub-components of one of the workpiece carrier devices are individually designated with reference symbols. The features, etc. described with respect to this workpiece carrier device 50 apply accordingly to the other workpiece carrier devices 50.

Each of the workpiece carrier devices 50 comprises a frame structure 52 with a plurality of individual holders 54 or substrate receptacles 54 formed thereon. One substrate 12 is respectively held by an associated individual holder 54, wherein the individual holders 54 being movable via a drive shaft 56 (see FIGS. 6, and 7 to 9) of the workpiece carrier device 50 in order to move the substrates 12 during coating in accordance with a predetermined movement sequence.

The workpiece carrier device 50 comprises an elongated connecting arm 58. This elongated connecting arm 58 adjoins the frame structure 52 or is here formed integrally with the frame structure 52 and is thus a part of the frame structure 52. The connecting arm 58 is configured to connect the frame structure 52 to a here L-shaped rake arm 24 of the production plant 10. For this purpose, the connecting arm 58 is provided with a special coupling interface 60 at one end. The rake arm 24 itself is in turn coupled to a manipulator 25 of the production plant 10 and can be moved by means of the manipulator 25.

In order to coat the substrates 12, at least one (here two) of the workpiece carrier devices 50 is/are positioned in a processing zone 14 of the production plant 10. In the example shown, the processing zone is a loading chamber of the production plant 10, from which the workpiece carrier devices 50 can be brought into a coating chamber by linear displacement of the manipulator 25. In contrast to conventional coating plants, the substrates 12 in the production plant 10 according to the disclosure are not introduced individually into the processing zone 14, but a plurality of substrates 12 are introduced simultaneously into the processing zone 14 by displacement of the entire workpiece carrier device 50. More specifically, in the production plant 10 shown, two workpiece carrier devices 50 are simultaneously displaced into the processing zone 14.

For this purpose, the production plant 10 comprises a robot 16. In the embodiment shown, the robot 16 is an articulated arm robot. At the end of the robot arm, the robot 16 comprises two robot grippers 18, by means of which two separate workpiece carrier devices 50 can be gripped simultaneously in order to subsequently displace them, i.e. to raise, pivot and lower them. It is understood that in alternative exemplary embodiments, the robot 16 may comprise only one robot gripper 18 for gripping one workpiece carrier device 50 or more than two robot grippers for gripping more than two separate workpiece carrier devices. Gripping, lifting, pivoting and lowering can be implemented automated and specified by a control program.

The robot 16 is configured and arranged to displace the workpiece carrier devices 50 from a supply zone 20 to the processing zone 14. Thus, workpiece carrier devices 50 preassembled with substrates 12 to be coated can be provided in the supply zone 20. In particular, to this end, the workpiece carrier devices 50 may be placed on a centering tray 80 in the supply zone 20 in order to ensure a predetermined position, rotational position and orientation of the workpiece carrier devices 50 in the supply zone 20.

Furthermore, the robot 16 is configured and arranged to displace the workpiece carrier devices 50 from the processing zone 14 to an removal zone 22 after processing. Thus, the workpiece carrier devices 50 assembled with the now coated substrates 12 can be transported away from the removal zone 22. In the removal zone 22, too, the workpiece carrier devices 50 can again be placed on a centering tray 82 to again ensure a predetermined position, rotational position and orientation of the workpiece carrier devices 50.

More specifically, to ensure the predetermined position, rotational position and orientation of the workpiece carrier devices 50, the centering trays 80, 82 each comprise at least one receptacle 84 and one centering bolt 86 (in the exemplary embodiment shown, two receptacles 84 and two centering bolts 86). The workpiece carrier devices 50 can be positioned in the respective associated receptacle 84 by means of the robot 16, so that the associated centering bolt 86 engages in a hole (see FIGS. 8 and 9) of the workpiece carrier device 50. The function of the centering bolt 86 is described in more detail in connection with FIGS. 8 and 9.

By providing different supply and removal zones 20, 22, operational steps can be carried out in parallel, so that, for example, one or more new workpiece carrier device(s) 50 with uncoated substrates 12 can already be provided in the supply zone 20, while one or more workpiece carrier device (s) 50 with just-coated substrates 12 is/are displaced from the processing zone 14 to the removal zone 22.

The assembly of the workpiece carrier device(s) 50 with substrates 12 to be coated may occur either in the supply zone 20 or in an assembly zone (not shown) spaced from the supply zone 20. Removal of the coated substrates 12 may take place either in the removal zone 22 or in a disassembly zone spaced from the removal zone 22 (not shown). In order to transport the respective workpiece carrier device 50 from the assembly zone to the supply zone 20 and/or from the removal zone 22 to the disassembly zone, the associated centering trays may be displaceable, e.g., movable, slidable, or the like.

As can be seen in the illustrations of FIGS. 1 and 2, FIG. 1 shows the production plant 10 in a state in which two workpiece carrier devices 50 are disposed in the processing zone 14. Two further workpiece carrier devices 50 with substrates intended for coating are positioned in the supply zone 20. The robot 16 does not hold or carry any workpiece carrier devices in the state shown in FIG. 1. In contrast, FIG. 2 shows a state of the production plant 10 shortly after two workpiece carrier devices 50 with coated substrates 12 have been removed from the processing zone 14. The robot 16 holds or carries the two workpiece carrier devices 50 by means of the two robot grippers 18 in order to displace them into the removal zone 22 and position them there on the centering tray 82. The robot 16 then grips, by means of the two robot grippers 18, the workpiece carrier devices 50 with substrates to be coated, which have been prepared in the supply zone 20 and positioned on the centering tray 80, in order to introduce them into the processing zone 14.

Figure 3:
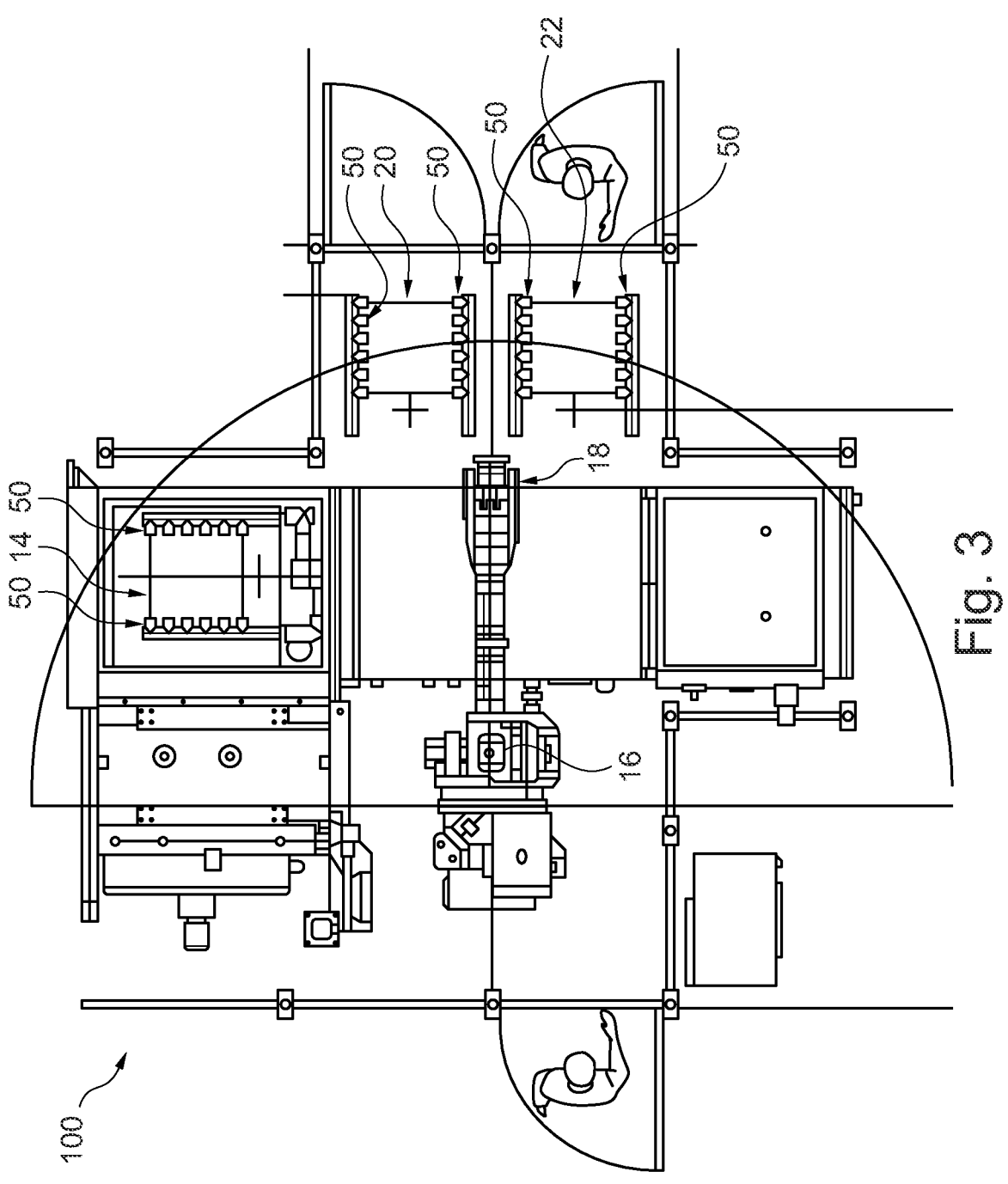
FIG. 3 shows a schematic top view of a production plant according to a further embodiment of the disclosure.
Figure 4:
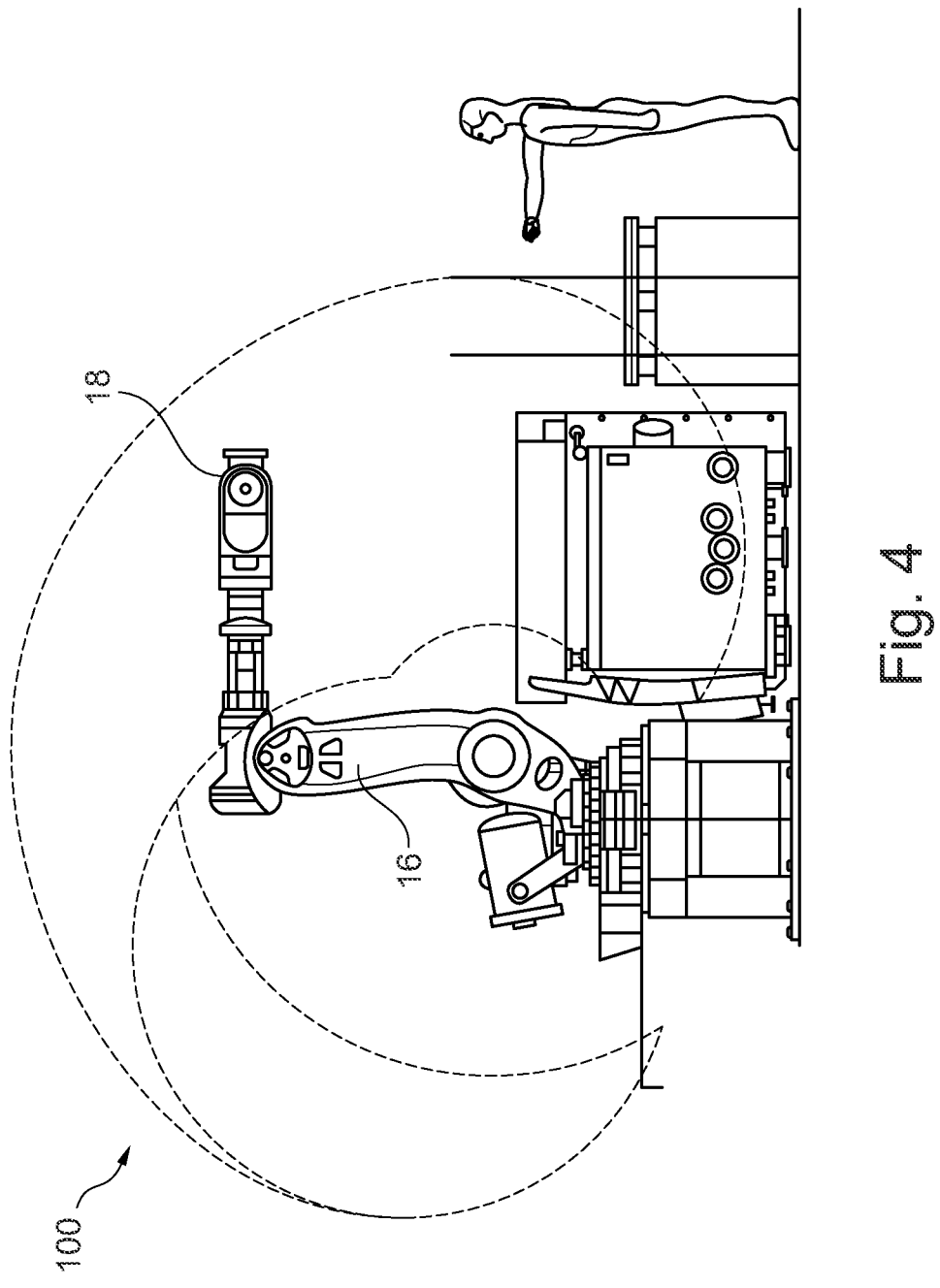
FIG. 4 shows a schematic side view of a robot of the production plant of FIG. 3.

FIGS. 3 and 4 show a production plant 100 according to a further exemplary embodiment. The production plant 100 corresponds essentially to the production plant 10 of FIGS. 1 and 2, with only a slightly modified arrangement of the components. The components of the production plant 100 are therefore provided with the same reference symbols as in FIGS. 1 and 2. The explanations with respect to the production plant 10 apply accordingly to the production plant 100.

Figure 5:
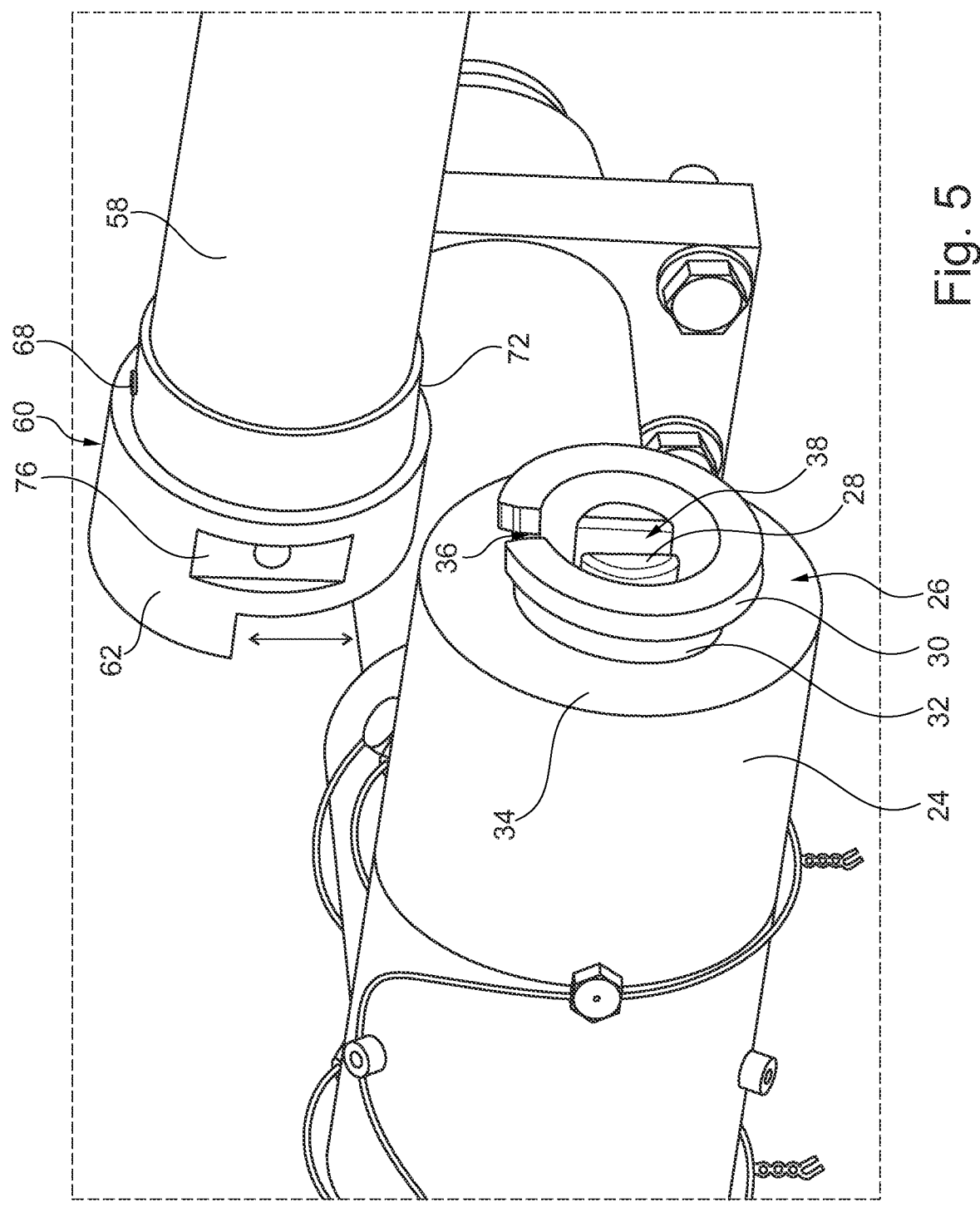
FIG. 5 shows a schematic detailed view of the production plant of FIG. 1 in the area of the coupling interface in a non-coupled state.
Figure 6:
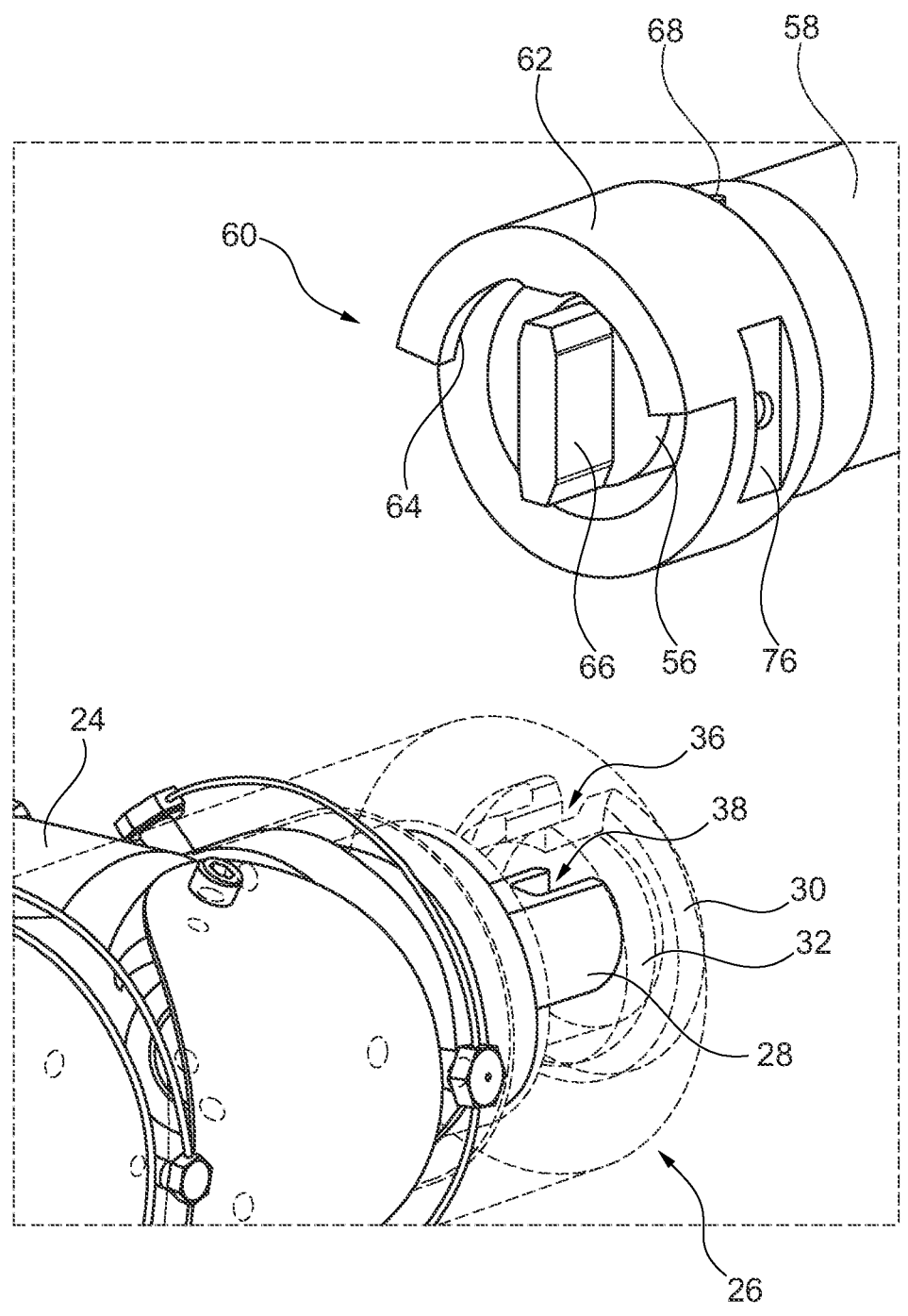
FIG. 6 shows a further schematic detail view of the production plant from FIG. 1 in the area of the coupling interface in a non-coupled state.
Figure 7:
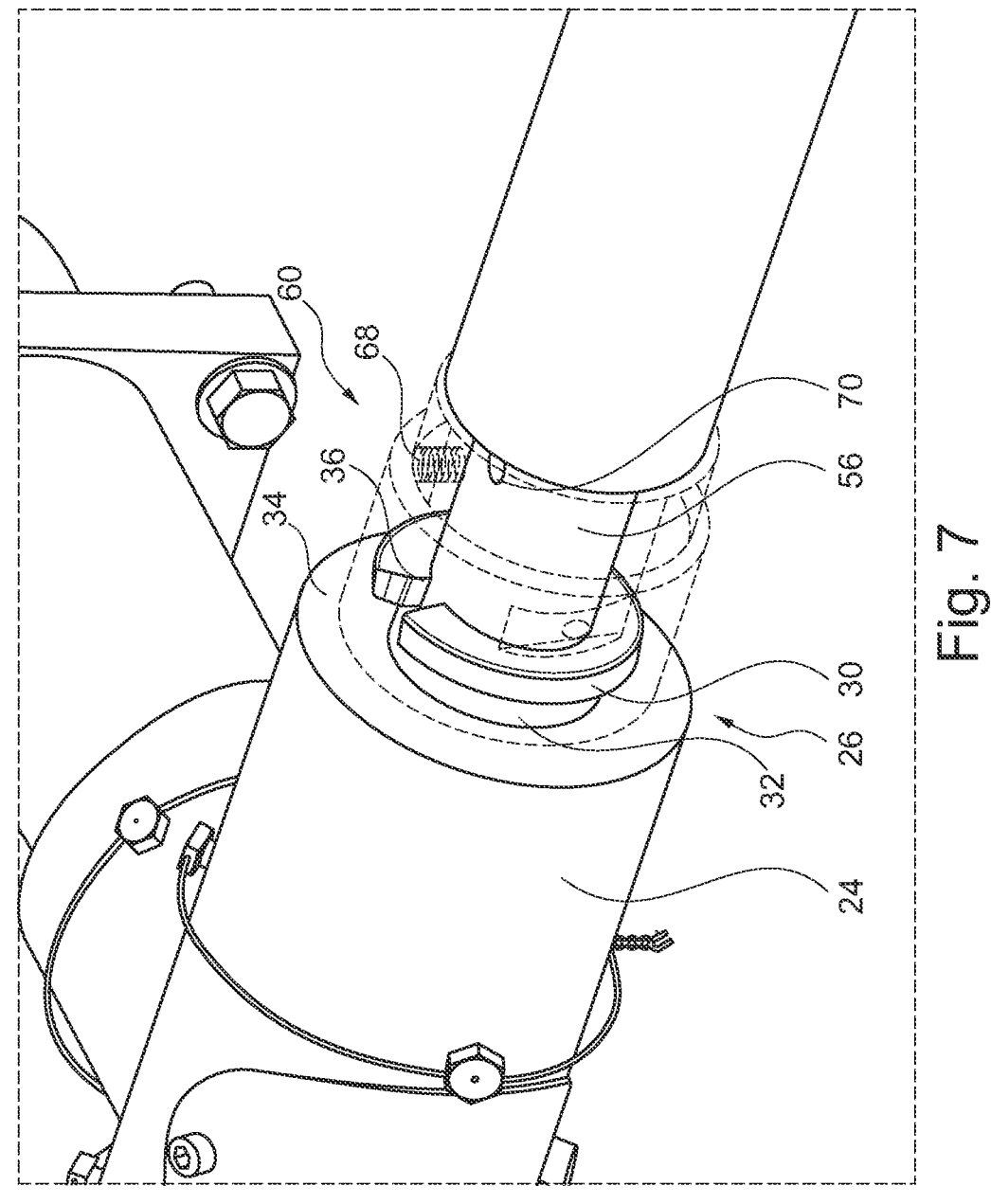
FIG. 7 shows a schematic detailed view of the production plant from FIG. 1 in the area of the coupling interface in a coupled state.
Figure 8:
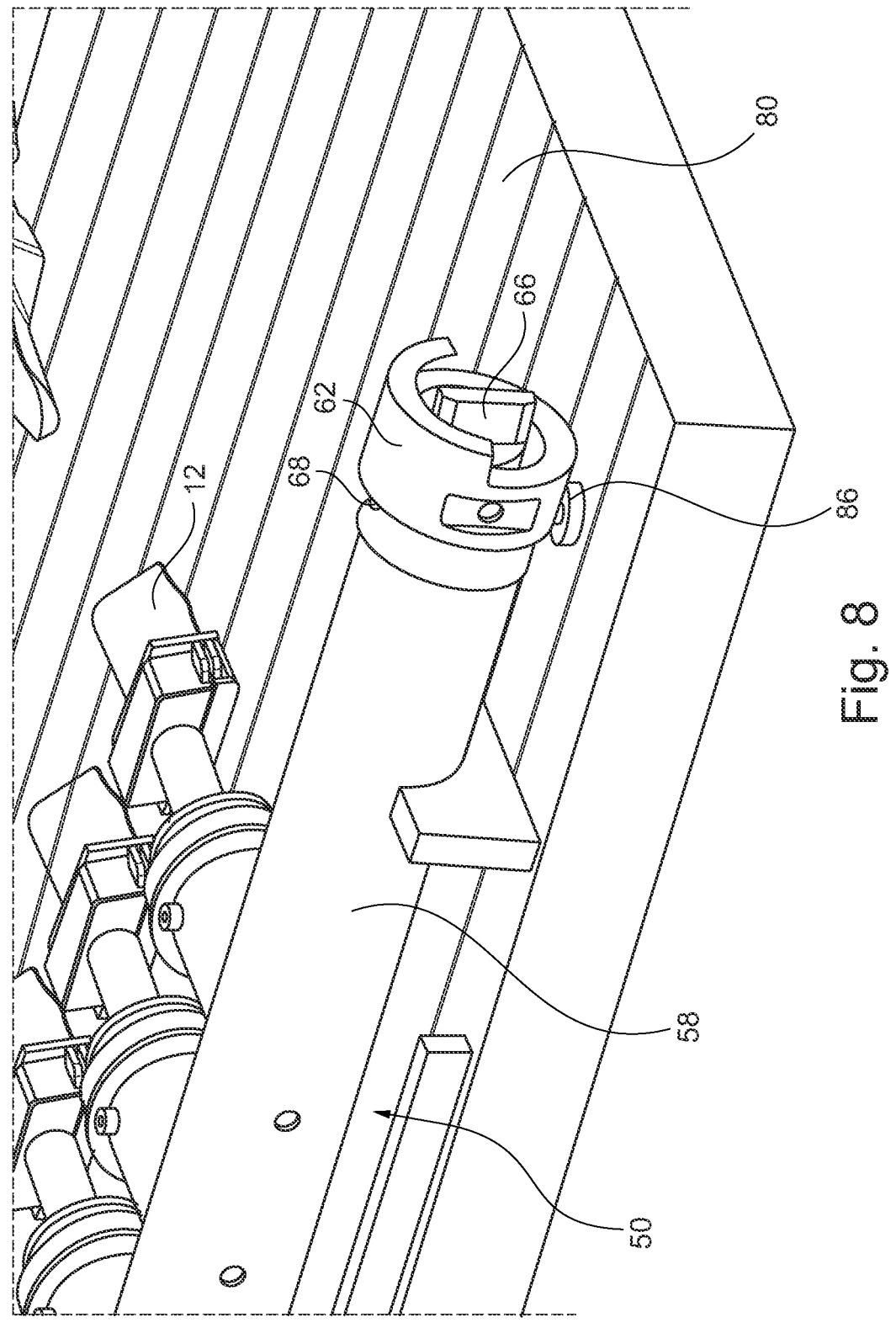
FIG. 8 shows a schematic detail view of the production plant from FIG. 1, showing a section of a workpiece carrier device positioned on a centering tray.

A section of the workpiece carrier device 50 in the region of the coupling interface 60 and of an end section of a rake arm 24 of the production plant 10 is shown in more detail in FIGS. 5, 6 and 7. Here, FIGS. 5 and 6 show the coupling interface 60 in a non-coupled state, i.e. shortly before or shortly after a coupling with the rake arm 24 of the production plant 10. FIG. 7 shows the coupling interface 60 in a coupled state.

The coupling interface 60 is designed in such a way that the workpiece carrier device 50 can be releasably coupled to the production plant 10 by means of the robot 16, in particular to a rake arm 24 of the production plant 10. Releasable means that by coupling the workpiece carrier device 50 to the production plant 10 by means of the coupling interface 60, a fixed connection can be temporarily established between the workpiece carrier device 50 and the production plant 10. This fixed connection can be released again for changing the workpiece carrier device 50 without having to damage components for this purpose.

The structural design of the workpiece carrier device 50 in the area of its coupling interface 60 enables a simple coupling and uncoupling to and from the rake arm 24 of the production plant 10 and thus for the first time enables automated changing of the entire workpiece carrier device 50 together with a plurality of substrates 12.

As can be seen in FIGS. 5 to 7, the connecting arm 58 can be statically coupled to a connection section 26 of the rake arm 24 of the production plant 10 by means of the coupling interface 60 in order to hold the connecting arm 58 in a fixed position relative to the connection section 26 and thus to the rake arm 24. In this way, the frame structure 52 or the entire workpiece carrier device 50 is held in a fixed position relative to the rake arm 24.

Further, it can be seen that by means of the coupling interface 60, the drive shaft 56 can be mechanically coupled to a driving shaft 28 of the production plant 10 in order to rotatably connect the drive shaft 56 to the driving shaft 28. The driving shaft 28 is rotatably mounted in the connection section 26 or the rake arm 24, and is in turn rotatably drivable by means of a motor (not shown) of the production plant 10. The drive shaft 56 is rotatably mounted in the connecting arm 58 and is mechanically coupled to the plurality of individual holders 54. Thus, when the drive shaft 56 and the driving shaft 28 are coupled, the plurality of substrates 12 can be driven in a desired manner by the motor.

For releasably coupling the connecting arm 58 to the connection section 26 of the rake arm 24, the coupling interface 60 in the embodiment shown includes a collar 62 that protrudes beyond a free end of the connecting arm 58 toward the rake arm 24. The collar 62 extends or elongates a portion of the outer peripheral surface of the connecting arm 58 in the axial direction. In the embodiment shown, the connecting arm 58 is tubular in shape, so that the collar 62 is in the shape of an annular ring segment by itself. On its inner circumferential surface, the collar 62 is provided with a retaining projection 64 (see FIGS. 6 and 7), which projects from the inner circumferential surface in the direction of the longitudinal axis, i.e., projects downward in FIGS. 5 to 7. The retaining projection 64 is configured to engage behind a flange 30 of the connection section 26 when the workpiece carrier device 60 is coupled to the rake arm 24. The flange 30 is formed on an annular ring 32 of the connection section 26, wherein the annular ring 32 extends axially from an end face 34 of the rake arm 24 toward the connection arm 58. The flange 30 extends upwardly from an outer circumferential surface of the annular ring 32 in the representation shown in FIGS. 5 to 7. The annular ring 32 and the flange 30 formed thereon are provided with a common axial recess 36. As can be seen in the synopsis of FIGS. 5 to 7, the releasable coupling can be realized in a simple manner by lowering the workpiece carrier device 50 in the direction of the longitudinal axis of the rake arm 24. It is understood that decoupling may be similarly realized by lifting the workpiece carrier device 50.

Further, the drive shaft 56 is provided with a sword-shaped end portion 66 for releasably coupling to the driving shaft 28. That is, at one end of the drive shaft 56, the end face has an elongated projection 66 or key 66 (sword-shaped end portion 66) that projects toward the driving shaft 28. The length of the projection 66/key 66 corresponds here to the diameter of the driving shaft 56. The projection 66/key 66 is designed to engage with a complementary recess 38 (or groove or slot) of the driving shaft 28, so that a form-fitting connection can be realized between the driving shaft 28 and the drive shaft 56, which enables rotary movements to be transmitted from the driving shaft 28 to the drive shaft 56. For this purpose, the projection 66/key 66 is insertable through the axial recess 36 into the groove 38/slot 38 of the driving shaft. As can be seen in the synopsis of FIGS. 5 to 7, this engagement can be realized by lowering the workpiece carrier device 50 in the direction of the longitudinal axis of the rake arm 24. It is understood that decoupling of the shafts 28, 56 can be similarly realized by lifting the workpiece carrier device 50.

In order to insert the projection 66/key 66 into the groove 38/slot 38, the drive shaft 56 and the driving shaft 28 must first be brought into a predetermined rotational position with respect to each other. This alignment is shown in FIGS. 5 to 7.

For this purpose, the driving shaft 28 is brought into the rotational position shown before coupling and/or decoupling by means of the motor and a PLC program.

In the embodiment shown, the rotational position of the drive shaft 56 is realized by means of centering/locking bolts and associated holes. For this purpose, the connecting arm 58 includes a first through hole 68 extending through the wall of the connecting arm 58. In addition, the drive shaft 56 includes an associated first drive shaft hole 70 (FIG. 7). The first through-hole 68 and the first drive shaft hole 70 are equally spaced from the end face of the drive shaft 56 in the axial direction. Since the drive shaft 56 is rotatable relative to the connecting arm 58, the first through hole 68 and the first drive shaft hole 70 are coaxial with each other only in a predetermined relative rotational position of the drive shaft 56 and the connecting arm 58 of the frame structure 52.

Figure 9:
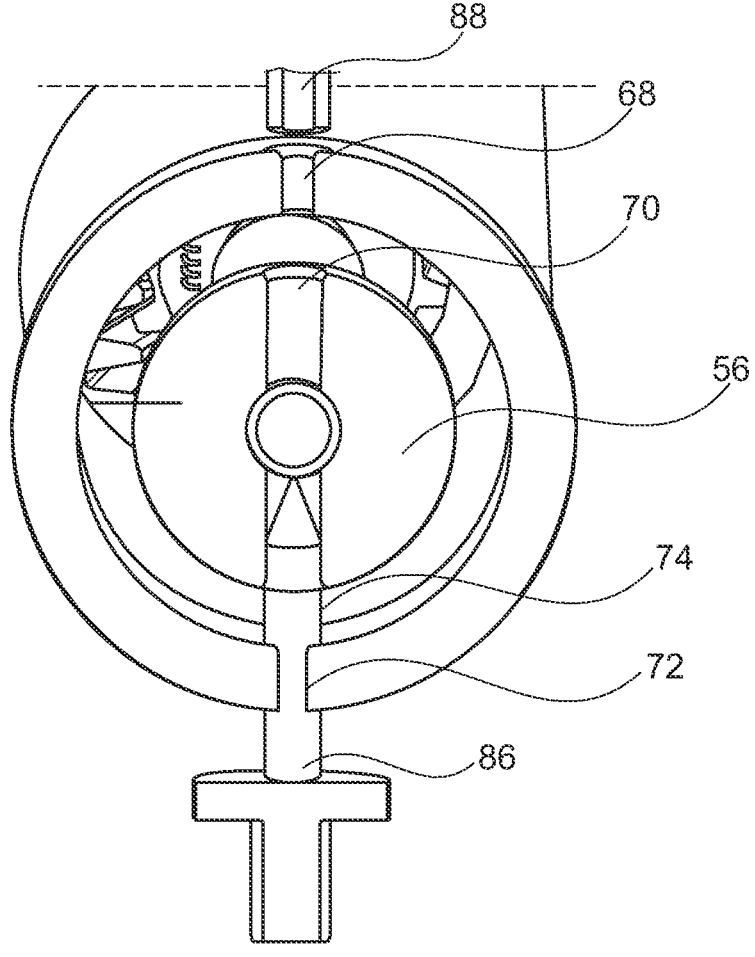
FIG. 9 shows a sectional view showing the detailed view shown in FIG. 9.

The connecting arm 58 further includes a second through hole 72 extending through the wall of the connecting arm 58 (indicated in FIG. 5 and shown in FIG. 9). In addition, the drive shaft 56 includes an associated second drive shaft hole 74 (shown in FIG. 9). The second through hole 72 and the second drive shaft hole 74 are spaced by an equal distance from the end face of the drive shaft 56 in the axial direction. Since the drive shaft 56 is rotatable relative to the connecting arm 58, the second through hole 72 and the second drive shaft hole 74 are also coaxial with each other only in the predetermined relative rotational position of the drive shaft 56 and the connecting arm 58. The predetermined relative rotational position is shown in FIGS. 5 to 9.

The second through hole 72 and the second drive shaft hole 74 are both spaced from the end face of the drive shaft 56 by the same distance in the axial direction as the first through hole 68 and the first drive shaft hole 70. The second through hole 72 and the second drive shaft hole 74 are disposed at a position opposite to the first through hole 68 and the first drive shaft hole 70 on the circumferential surface of the connecting arm 58 and the circumferential surface of the drive shaft 56, respectively. More specifically, the second through hole 72 is circumferentially offset by 180° from the first through hole 68, and the second drive shaft hole 74 is circumferentially offset by 180° from the first drive shaft hole 70.

In a coupled state, the drive shaft 56 can be brought into the rotational position shown by means of the driving shaft 28 by the motor and the PLC program. In this rotational position, the drive shaft 56 is then fixed by means of a locking bolt 88 (see FIG. 10) of the robot 16 that engages the first drive shaft hole 70 through the first through hole 68, thereby fixing the drive shaft 56 relative to the connecting arm 28 and blocking a relative rotation. The locking bolt 88 can be displaced automated into and out of the first holes, for example effected pneumatically, hydraulically and/or electromechanically.

To ensure that the drive shaft 56 is always fixed in the predetermined rotational position, the locking bolt 88 is inserted into the first holes 68, 70 before the workpiece carrier device 50 is raised and thus decoupled from the rake arm 24. The drive shaft 56 is therefore momentarily fixed in its rotational position by the locking bolt 88 and by the coupling of the drive shaft 56 to the driving shaft 28.

Similarly, the locking bolt 88 is not withdrawn from the first holes 68, 70 until a centering bolt 86 engages the second through hole 72 and the second drive shaft hole 74 and fixes the drive shaft 56 relative to the connecting arm 58. Insertion of the centering bolt 86 into the second holes 72, 74 may be realized by lowering or placing the workpiece carrier device 50 on the centering tray 80, 82, wherein in one embodiment the centering bolt 86 may be formed fixedly on the centering tray 80, 82 (as shown in FIGS. 1, 2, 8 and 9). To insert the centering bolt 86 into the second holes 72, 74, the workpiece carrier device 50 is targetedly positioned on the centering tray 80, 82 by means of the robot 16.

For the best possible gripping, holding and displacement of the workpiece carrier device 50 by means of the robot 16, the connecting arm 58 comprises two lateral engagement surfaces 76 in the region of the coupling interface 60. The engagement surfaces 76 are milled into the peripheral surface of the connecting arm 58 and are formed opposite each other (only one engagement surface is shown in FIGS. 5 to 7 and 8).

Figure 10:
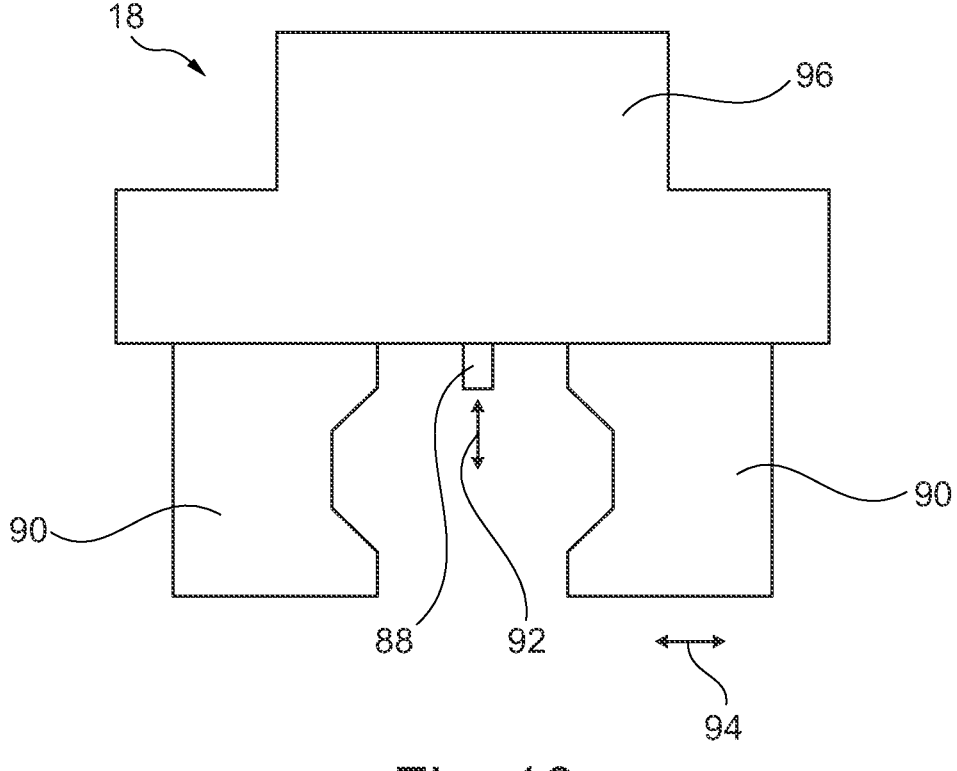
FIG. 10 shows a gripper of the robot with displaceable locking bolt.

In particular, the displaceable locking bolt 88 of the robot 16 may be formed in the region of the robot gripper 18, as shown by way of example in FIG. 10. In the exemplary embodiment shown, the locking bolt 88 is arranged between the gripper arms or gripper jaws 90 on a base body 96 of the robot gripper 18 and is linearly displaceable relative to the base body 96, which is indicated by the double arrow 92 (here a vertical displaceability). Furthermore, the gripper arms or gripper jaws 90 in the shown exemplary embodiment are also displaceable towards and away from each other, which is indicated by the double arrow 94. The gripper arms or gripper jaws 90 may be guided in the base body 96 of the robot gripper 18 so as to be linearly displaceable or be pivotally connected thereto.

| List of reference symbols | |
|---|---|
| 10 | production plant |
| 12 | substrate |
| 14 | processing zone |
| 16 | robot |
| 18 | robot gripper |
| 20 | supply zone |
| 22 | removal zone |
| 24 | rake arm |
| 25 | manipulator |
| 26 | connection section |
| 28 | driving shaft |
| 30 | flange |
| 32 | annular ring |
| 34 | end face |
| 36 | axial recess |
| 38 | complementary recess |
| 50 | workpiece carrier device |
| 52 | frame structure |
| 54 | individual holder/ substrate holder |
| 56 | drive shaft |
| 58 | connecting arm |
| 60 | coupling interface |
| 62 | collar |
| 64 | retaining projection |
| 66 | sword-shaped end section |
| 68 | first through hole |
| 70 | first drive shaft hole |
| 72 | second through hole |
| 74 | second drive shaft hole |
| 76 | engagement surface |
| 80 | centering tray |
| 82 | centering tray |
| 84 | receptacle |
| 86 | centering bolt |
| 88 | locking bolt |
| 90 | gripper arms or gripper jaws |
| 92 | arrow (direction of movement) |
| 94 | arrow (direction of movement) |
| 96 | base body |
| 100 | production plant |

The invention claimed is:

1. A method of changing a workpiece carrier device in a production plant for coating substrates, wherein the method comprises the steps of:

displacing a workpiece carrier device by means of a robot from a supply zone at the production plant to a processing zone in the production plant;

releasably coupling the workpiece carrier device to the production plant via a coupling interface of the workpiece carrier device by further displacing the workpiece carrier device by means of the robot, wherein for releasably coupling the workpiece carrier device to the production plant, a connecting arm of the workpiece carrier device is coupled to a connection section of the production plant, thereby fixing the connecting arm in a fixed position relative to the connection section, and wherein for releasably coupling the workpiece carrier device to the production plant, a drive shaft of the workpiece carrier device rotatably mounted in the connecting arm is coupled to a driving shaft of the production plant, whereby the drive shaft is connected to the driving shaft in a rotatably drivable manner.

2. The method according to claim 1, wherein the robot comprises a displaceable locking bolt, which, prior to displacing the workpiece carrier device to the processing zone, is inserted into a first through hole formed in the connecting arm and simultaneously into a first drive shaft hole formed in the drive shaft to block a relative rotation between the drive shaft and the connecting arm; and which is removed from the first through hole and the first drive shaft hole after releasably coupling the workpiece carrier device to the production plant in order to allow a relative rotation between the drive shaft and the connecting arm.

3. The method according to claim 1, wherein the workpiece carrier device is positioned in the supply zone on a centering tray having a centering bolt formed thereon such, that the centering bolt engages into a second through hole formed in the connecting arm and into a second drive shaft hole formed in the drive shaft in order to block a relative rotation between the drive shaft and the connecting arm.

4. The method according to claim 1 wherein prior to coupling the drive shaft to the driving shaft, the driving shaft of the production plant is brought into a predetermined rotational position relative to the drive shaft by means of a controller.

5. A workpiece carrier device for a production plant for coating substrates, wherein the workpiece carrier device comprises:

a frame structure having a plurality of individual holders for holding a plurality of substrates;

an elongated connecting arm for connecting the frame structure to a connection section of the production plant, wherein the connecting arm has a longitudinal axis;

a drive shaft rotatably mounted in the connecting arm and mechanically coupled to the plurality of individual holders to drive the plurality of substrates; and a coupling interface via which the workpiece carrier device can be releasably coupled to the production plant by means of a robot, wherein by means of the coupling interface the connecting arm is couplable to the connection section of the production plant to hold the connecting arm in a fixed position relative to the connection section, and wherein by means of the coupling interface the drive shaft is couplable to a driving shaft of the production plant in order to connect the drive shaft to the driving shaft in a rotatably drivable manner.

6. The workpiece carrier device according to claim 5, wherein the coupling interface comprises two engagement surfaces for a robot gripper formed on a peripheral surface of the connecting arm.

7. The workpiece carrier device according to claim 5, wherein the coupling interface comprises a first through hole formed in the connecting arm for a locking bolt of the robot and a first drive shaft hole formed in the drive shaft, wherein the first through hole and the first drive shaft hole are aligned with each other in a predetermined rotational position of the drive shaft.

8. The workpiece carrier device according to claim 5, wherein the coupling interface comprises a second through hole formed in the connecting arm for a centering bolt of a centering tray and comprises a second drive shaft hole formed in the drive shaft, wherein the second through hole and the second drive shaft hole are aligned with each other in a predetermined rotational position of the drive shaft.

9. The workpiece carrier device according to claim 5, wherein the coupling interface comprises a sword-shaped portion formed at one end of the drive shaft.

10. The workpiece carrier device according to claim 5, wherein the coupling interface comprises a collar formed at an end of the connecting arm and extending in the form of an annular segment in an axial direction beyond the end of the connecting arm, wherein the collar comprises a retaining projection formed on an inner peripheral surface thereof and extending from the inner peripheral surface in the direction of the longitudinal axis.

11. A production plant for coating substrates, comprising:

at least one workpiece carrier device according to claim 5 which is releasably connected or connectable to a connection section of the production plant, wherein a driving shaft is rotatably mounted in the connection section and is rotatably drivable by means of a motor.

12. The production plant according to claim 11, further comprising:

a robot configured to connect the workpiece carrier device to the connection section, to decouple the workpiece carrier device from the connection section, and to displace the workpiece carrier device.

13. The production plant according to claim 11, wherein the robot comprises a displaceable locking bolt insertable into the first through hole and the first drive shaft hole.

14. The production plant according to claim 11, wherein the connection section comprises an annular ring extending in an axial direction from an end face of a frame section and having a flange formed thereon, wherein the annular ring and the flange comprise an axial recess via which a section of the drive shaft is insertable into the connection section to connect the drive shaft to the driving shaft.

15. The production plant according to claim 11, wherein the production plant comprises a centering tray with a centering bolt formed thereon, which can be arranged at a predetermined position at the production plant, and wherein the workpiece carrier device can be positioned on the centering tray.

\* \* \* \* \*